United States Patent [19]

Gillis et al.

[11] Patent Number: 5,584,958
[45] Date of Patent: Dec. 17, 1996

[54] POLYISOCYANATE ADHESIVE AND SEALANT SYSTEMS

[75] Inventors: Herbert R. Gillis, Sterling Heights, Mich.; John R. Robertson, Glenn Mills, Pa.

[73] Assignee: Imperial Chemical Industries PLC, London, England

[21] Appl. No.: 180,939

[22] Filed: Jan. 12, 1994

Related U.S. Application Data

[62] Division of Ser. No. 925,347, Aug. 4, 1992.

[51] Int. Cl.$^6$ .............. C09J 4/00; C09J 101/00; C09J 201/00; B32B 5/14
[52] U.S. Cl. .............. 156/331.4; 428/308.8; 428/311.7; 428/317.1; 428/423.1; 428/425.1; 524/590
[58] Field of Search .............. 156/331.4; 428/308.8, 428/311.7, 317.1, 317.7, 423.1, 425.1

[56] References Cited

U.S. PATENT DOCUMENTS

| | | | |
|---|---|---|---|
| 3,865,791 | 2/1975 | Brinkmann et al. | 260/77.5 |
| 4,507,443 | 3/1985 | Barron et al. | 525/453 |
| 4,720,535 | 1/1988 | Schleier et al. | 528/59 |
| 4,794,129 | 12/1988 | Gillis, Jr. et al. | 521/121 |
| 4,853,454 | 8/1989 | Merger et al. | 528/59 |
| 4,935,460 | 6/1990 | Cassidy et al. | 524/251 |
| 5,010,161 | 4/1991 | Aoki et al. | 528/59 |
| 5,087,661 | 2/1992 | Aoki et al. | 524/714 |
| 5,253,461 | 10/1993 | Janoski et al. | 52/408 |

FOREIGN PATENT DOCUMENTS

| | | |
|---|---|---|
| 1110655 | 4/1968 | United Kingdom . |
| 1575666 | 9/1980 | United Kingdom . |

*Primary Examiner*—Paul R. Michl
*Assistant Examiner*—Patrick Niland

[57] ABSTRACT

Improved sealants and adhesives derived from polyisocyanates having aromatically linked —NCO groups are cured at ambient temperatures when combined with a curing agent comprising an imino- and enamino-functional compound. These two component resin systems may be employed in fabricating multi-substrate laminates, especially those comprising lignocellulosic and cellulosic materials, such as wood and paper.

12 Claims, No Drawings

5,584,958

POLYISOCYANATE ADHESIVE AND SEALANT SYSTEMS

This is a divisional of application Ser. No. 07/925,347 filed on Aug. 4, 1992.

FIELD OF THE INVENTION

This invention is directed to aromatic polyisocyanate reaction systems especially useful as adhesives and sealants. In particular, the invention is directed to a two component reaction system comprising an aromatic polyisocyanate as the binding agent and an isocyanate reactive compound as the curing agent. It is further directed to laminated and/or sealed materials employing the novel two component system.

BACKGROUND OF INVENTION

Various resins have been used in the manufacture of laminated wood and paper structures such as laminated veneer lumber (LVL), including plywood, chipboard, particleboard, and paper tubing. An important consideration in the choice of an adhesive for manufacturing said articles is the curing rate and the temperature required for promoting curing. In many cases the billets to be bonded are over three centimeters in thickness. In such cases, the penetration of heat is very slow and requires the consumption of substantial time and energy.

In practice, the most widely used adhesives are resorcinol/phenol formaldehyde type resins which provide excellent adhesion but nevertheless require heat activation and considerable amounts of time to cure. Another drawback encountered in their use is their black color which contributes to an aesthetically less attractive end product. A further drawback to the use of phenolic resin adhesives is that they cannot be used effectively with substrates having high moisture contents. Since many wood substrates have moisture contents of 10% by weight or above, it is necessary to dry the substrates so that they have about a 5% by weight moisture content. When wood substrates are treated to reduce their moisture content, it results in a loss of wood volume and increases the cost and time of producing wood products which employ the phenolic resins.

Isocyanate crosslinked latexes have also been employed as adhesives but their cure rate is relatively slow even with the application of heat. Polyisocyanates have been employed as adhesives for the manufacture of cellulosic materials in the formation of waferboard, fiberboard and paper laminates. Such applications employing polyisocyanates normally require temperatures up to 200° C. or more for curing in order to develop acceptable physical bonding strengths.

The use of polyisocyanates and imino- and enamino-functional compounds in reaction injection molding systems is known in the art. For example, U.S. Pat. No. 4,794,129 discloses a reaction system for making a polymer by a reaction injection molding process wherein the system is comprised of an organic aromatic polyisocyanate and an isocyanate reactive composition comprising at least one imino-functional compound. U.S. Pat. No. 4,935,460 discloses a reaction injection molding system in which the A-component is an organic polyisocyanate and the B-component is an isocyanate reactive component comprising the reaction product of an isocyanate-terminated polyurethane prepolymer and an imino-functional or enamine-containing compound. Neither patent, however, discloses that its reaction systems can be employed as adhesives or sealants.

Also, U.S. Pat. No. 3,865,791 discloses the preparation of a prepolymer from a mixture comprising, in part, a monoenamine and a polyisocyanate. This prepolymer may then be combined with further polyisocyanate and moisture-cured. U.S. Pat. No. 4,853,454 discloses a single component moisture-curable polyurethane system comprising a polyurethane prepolymer and a polyaldimine. The compositions of these patents may be used as coatings, castings, patchings, and cements. However, neither of these patents disclose the use of the compositions with lignocellulosic or cellulosic materials in the preparation of composite products, such as particleboard.

There is a need for a cold curable resin system which fully cures in a short period of time at room temperature yet has an adequate pot life suitable for commercial production. Ideally, such an adhesive system could be cured within 30 minutes at room temperature, have a working pot life of greater than 5 minutes and provide a bonding strength equal to or greater than the prior art resin systems.

There is also a need for an adhesive which can be employed with high moisture containing substrates, particularly lignocellulosic or cellulosic substrates.

It is, therefore, an object of this invention to provide an adhesive/sealant reaction system which can be cold cured.

It is another object to provide an adhesive/sealant reaction system which can be cured at or near room temperature within a relatively short period of time.

It is a further object to provide an adhesive/sealant reaction system which has a working pot life of greater than 5 minutes.

It is also an object to provide an adhesive system which provides a bonding strength equal to or greater than the bonding strength of prior art resin systems.

It is yet another object to provide an adhesive system which may be employed with relatively high moisture containing substrates, such as lignocellulosic or cellulosic substrates.

These and other objects are achieved by the reaction systems of the present invention.

SUMMARY OF INVENTION

The invention is a low temperature curable adhesive or sealant reaction system suitable for use in the preparation of lignocellulosic and cellulosic composites and a process for sealing or adhering lignocellulosic or cellulosic substrates to one another employing the reaction system. The liquid adhesive/sealant reaction system comprises:

(a) a polyisocyanate having aromatically linked isocyanate groups and a number average isocyanate functionality in the range of 1.8 to 4.0.

(b) a curing agent having at least one imino- or enamino-functional linkage wherein the molecular number ratio of the isocyanate groups in the polyisocyanate to imino- or enamino-functional linkages is at least 2:1.

The process for preparing composites of lignocellulosic or cellulosic substrates comprises the steps of:

(a) coating a surface of one of the substrates with a liquid adhesive reaction system comprising:

(i) a polyisocyanate having aromatically linked isocyanate groups and a number average isocyanate functionality in the range of 1.8 to 4.0; and (ii) a curing agent having at least one imino- or enamino-functional linkage wherein the molecular number ratio of the isocyanate groups in the polyisocyanate to imino- or enamino-functional linkages is at least 2:1;

(b) pressing the substrates together; and (c) curing the adhesive reaction system.

The present invention further comprises a reaction system comprising:

(a) a polyisocyanate having aromatically linked isocyanate groups and a number average isocyanate functionality in the range of 1.8–4.0, wherein the polyisocyanate is not a prepolymeric isocyanate; and (b) a curing agent having at least one imino- or enamino-functional linkage wherein the molecular number ratio of the isocyanate groups and the polyisocyanate to imino- or enamino-functional linkages is at least 2:1.

The present invention further comprises a process for bonding substrates together comprising the steps of:

(a) coating a surface of one of the substrates with a liquid adhesive reaction system comprising:

(i) a polyisocyanate having aromatically linked isocyanate groups and a number average isocyanate functionality in the range of 1.4–4.0, wherein the polyisocyanate is not a prepolymeric isocyanate; and (ii) a curing agent having at least one imino- or enamino-functional linkage, wherein the molecular number ratio of the isocyanate groups in the polyisocyanate to imino- or enamino-functional linkages is at least 2:1;

(b) pressing the substrates together; and (c) curing the adhesive reaction system.

The process for sealing surfaces of a substrate, according to the present invention, comprises the steps of:

(a) coating at least one surface of a substrate with a liquid sealant reaction system comprising:

(i) a polyisocyanate having aromatically linked isocyanate groups and a number average isocyanate functionality in the range of 1.8 to 4.0 wherein the polyisocyanate is not a prepolymeric isocyanate; and (ii) a curing agent having at least one imino- or enamino-functional linkage wherein the molecular number ratio of the isocyanate groups in the polyisocyanate to imino- or enamino-functional linkages is at least 2:1; and (b) curing the sealant reaction system.

DETAILED DESCRIPTION OF THE INVENTION

The organic polyisocyanates useful in this invention have a number-average isocyanate functionality from 1.8 to 4.0, preferably from 2 to 3, and a number average molecular weight between 100 and 5000, preferably between 120 and 1800 and most preferably between 170 and 800. At least 50 mole percent, preferably at least 90 mole percent, of isocyanate groups in the species comprising the polyisocyanate are bonded directly to aromatic rings.

Suitable aromatic polyisocyanates include, for example, p-phenylene diisocyanate; m-phenylene diisocyanate; 2,4-toluene diisocyanate; 2,6-toluene diisocyanate; naphthalene diisocyanate; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polydiphenylmethane polyisocyanate having a functionality greater than 2, mixtures thereof and the like. The MDI isomers (2,4' and 4,4'), mixtures of these isomers with polydiphenylmethane polyisocyanates, polyphenylmethane polyisocyanate itself and derivatives thereof are most preferred. The polyphenylmethane polyisocyanates and derivatives thereof are most preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like.

Suitable uretonimine-modified polyisocyanates can be used and are generally prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols, including aminated polyols or imines/enamines thereof. As used herein, the term "isocyanate-terminated prepolymer" includes the prepolymer as well as the pseudoprepolymer, i.e., a mixture of the prepolymer and the polyisocyanate from which the prepolymer is prepared. Suitable polyols for preparing prepolymers include:

(a) polyether polyols and/or hydrocarbon-based polyols having a molecular weight from 60 to 400, and an average hydroxyl functionality from 1.9 to 4;

(b) polyether (and/or thioether) polyols having a molecular weight of at least 400, preferably 1000 or higher, and an average hydroxyl functionality from 1.9 to 4;

(c) polyester polyols having a molecular weight from 100 to 1000, and an average hydroxyl functionality from 1.9 to 4;

The isocyanate-terminated prepolymers are also useful for use in preparing lignocellulosic of cellulosic composites in accordance with the present invention. A particularly preferred isocyanate-terminated prepolymer is the reaction product of an excess of a polymeric MDI and a polyether polyol wherein the polyol has a number average molecular weight in the range of 400 to 2500. Such isocyanate-terminated prepolyers should generally have a free-NCO content of more than 10%, preferably more than about 16% and more preferably about 16 to 24%. A suitable polymeric MDI composition for use in the present invention is Rubinate M, which is available from ICI Americas.

The curing agent of this adhesive/sealant reaction system is an isocyanate reactive composition having at least one imino-functional or enamino-functional linkage. These "functional linkages" refer to the imino- and/or enamino-groups present in the curing agent compositions. The curing agents may optionally contain one or more other isocyanate-reactive groups, especially hydroxyl or carboxylic acid groups.

"Reaction system" as used herein means a system or assemblage of reaction components which, in the system, are unreacted or not fully reacted but which in use, are reacted with each other.

"Imino-functional" as used herein means that a reactant contains the grouping:

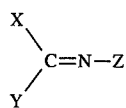

wherein X, Y and Z are chemical moieties which collectively form the rest of said compound and are each independently selected from hydrogen and organic radicals which are attached to the imino unit:

$$C=N-$$

of said compound through N, C, O, S, Si or P, the central carbon atom of said imino unit being bonded to three atoms; provided, however, that if both X and Y are organic radicals and X or Y is attached to the imino unit through N, then the other radical (X or Y) is preferably not attached to the imino unit through C or N and is attached to the imino unit through O, S, Si or P, and most preferably through O or S. As a result, certain amidines and guanidines are preferably not employed as imino functional curing agents in this invention. Also, in the above structure, neither the carbon nor the nitrogen atom of the imino unit should be incorporated within an aromatic or other fully conjugated ring or ring system even though X, Y and Z may be joined together to form rings. It is preferred that Z is attached to the imino unit through carbon and that X and Y are independently H or organic radicals attached through C, N or O. It is most preferred that X, Y or Z is attached through aromatic carbon atoms.

Many types of imino-functional and enamino-functional compounds are suitable for use as curing agents in this invention. In general, the curing agent is selected from the group consisting of simple imines, imino esters, imino thioesters, isoureas, isothioureas and enamines.

Suitable imino-functional compounds include, but are not limited to, those listed in Table A below.

TABLE A

| Structure | Name |
|---|---|
| $\text{\textcircled{P}}-R^5-\underset{\underset{R^6}{\vert}}{C}=N-R^7$ | Simple Imine |
| $\text{\textcircled{P}}-R^5-O-\underset{\underset{R^6}{\vert}}{C}=N-R^7$ | Imino ester |
| $\text{\textcircled{P}}-Ar-O-\underset{\underset{R^6}{\vert}}{C}=N-R^7$ | Imino ester (aromatic) |
| $\text{\textcircled{P}}-R^5-S-\underset{\underset{R^6}{\vert}}{C}=N-R^7$ | Imino thioester |
| $\text{\textcircled{P}}-Ar-S-\underset{\underset{R^6}{\vert}}{C}=N-R^7$ | Imino thioester (aromatic) |
| $\text{\textcircled{P}}-R^5-N=\underset{\underset{R^7}{\vert}}{\overset{\overset{R^6}{\vert}}{C}}$ | Simple Imine |
| $\text{\textcircled{P}}-R^5-N=\underset{\underset{Ar'}{\vert}}{\overset{\overset{R^6}{\vert}}{C}}$ | Simple Imine (aromatic) |

TABLE A-continued

| Structure | Name |
|---|---|
| $\text{\textcircled{P}}-R^5-\underset{\underset{OR^7}{\vert}}{C}=N-R^6$ | Imino ester (aliphatic) |
| $\text{\textcircled{P}}-R^5-\underset{\underset{OAr'}{\vert}}{C}=N-R^6$ | Imino ester (aromatic) |
| $\text{\textcircled{P}}-R^5-\underset{\underset{SR^7}{\vert}}{C}=N-R^6$ | Imino thioester (aliphatic) |
| $\text{\textcircled{P}}-R^5-\underset{\underset{SAr'}{\vert}}{C}=N-R^6$ | Imino thioester (aromatic) |
| $\text{\textcircled{P}}-R^5-O-\underset{\underset{NHR^6}{\vert}}{C}=N-R^6$ | Isourea |
| $\text{\textcircled{P}}-R^5-O-\underset{\underset{NH_2}{\vert}}{C}=N-R^7$ | Isourea |
| $\text{\textcircled{P}}-R^5-S-\underset{\underset{NHR^6}{\vert}}{C}=N-R^6$ | Isothiourea |
| $\text{\textcircled{P}}-R^5-S-\underset{\underset{NH_2}{\vert}}{C}=N-R^7$ | Isothiourea | wherein:

$R^5$ and Ar are divalent aliphatic and aromatic organic linking groups, respectively;

$\text{\textcircled{P}}$ represents H or an organic radical, such as a polyether or hydrocarbon chain or radical, to which said imino (C=N) functional group is attached as indicated in the table. $\text{\textcircled{P}}$ may be mono or polyfunctional.

$R^6$ is H or a monovalent organic aliphatic group of 1 to 10 carbon atoms;

$R^7$ and $R^8$ are monovalent aliphatic organic groups of 1 to 10 carbon atoms, and Ar' is a monovalent aromatic organic group of 4 to 18 carbon atoms.

The groups which $R^5$, $R^6$, $R^7$, $R^8$, Ar and Ar' represent are well known in the art. Thus $R^5$ may in particular be propylene, Ar methoxyphenylene, $R^6$ propyl, $R^7$ propyl, $R^8$ propyl and Ar' methoxyhenyl.

Examples of other suitable imino-functional curing agents include:

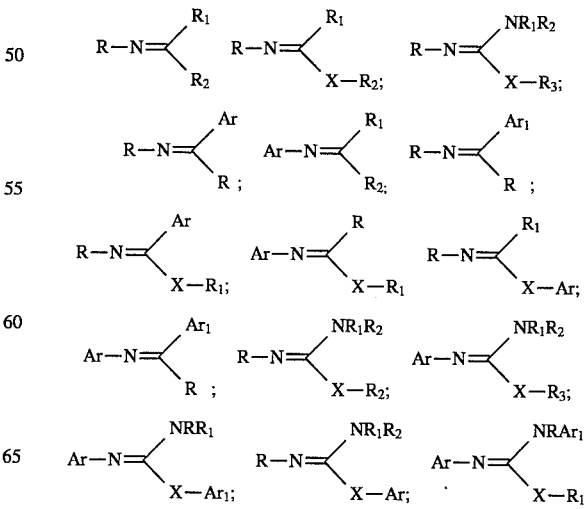

-continued

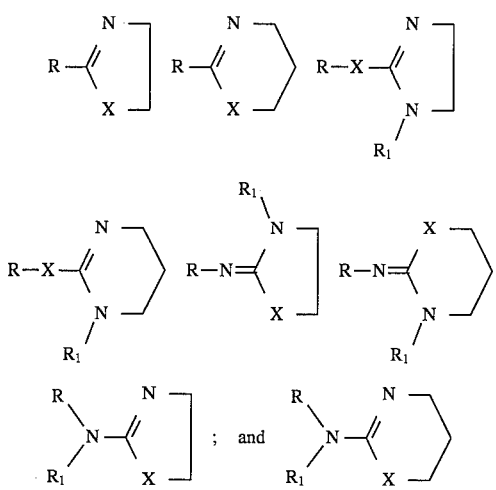

wherein X represents O or S and R, $R_1$, $R_2$ and $R_3$ represent organic groups bonded to the indicated structure through aliphatic carbon atoms; and, Ar and $Ar_1$ represent organic groups bonded to the indicated structure through aromatic carbon atoms. These groups may be the same or different. Any of these may contain hetero atoms, and they may be joined together to form rings (within the limitations provided by the basic definition of "imino-functional" above).

Preferably, one or more of the substituents in the formulas above contain other isocyanate reactive (or potentially reactive) functional groups. These additional functional groups are preferably selected from the category of imino/enamino functional groups, the category of hydroxyl (or thiol) groups; and/or the category of carboxylic acid groups. It is preferred that these curing agents be polyfunctional. Di- and poly-imines are most preferred.

In the above formulas any two or more of the substituents attached to the imino unit can be incorporated as members of a non-aromatic 5 or 6 membered ring. The ring can be carbocyclic or heterocyclic depending, for example, on the particular substituents so incorporated and on whether the carbon or the nitrogen atom (or both) of the imino unit are also incorporated.

When aromatic groups are present in the imino unit it is preferred that they be attached to the carbon atom of said unit and it is most preferred that said aromatic groups bear neutral or electron donating substituents such as H, alkyl, alkoxy, N,N-dialkyl-amino etc. groups.

Aromatic imino-functional compounds, and especially those wherein at least one aromatic ring is directly attached to the C=N unit of the aromatic imino-functional molecule are preferred curing agents. The most preferred curing agents are aromatic Imino-functional compounds containing two or more reactive functional groups per molecule. A preferred adhesive/sealant reaction system is comprised of a polyphenylmethane polyisocyanate and an aromatic imino-functional compound. Another preferred adhesive/sealant system is comprised of an aromatic imino-functional compound and an isocyanate terminated prepolymer which is the reaction product of an excess of a polymeric diphenylmethane diisocyanate and a polyether polyol, especially a polyether polyol having a number average molecular weight in the range of 400 to 2500.

Specific examples of preferred imino-functional compounds include simple aliphatic and/or aromatic aldimines and/or kerimines such as the following:

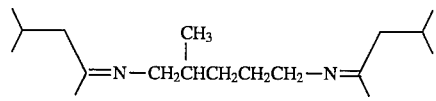

Dytek-A MIBK Diimine

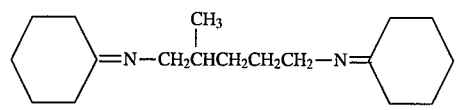

Dytek-A Cyclohexanone Diimine

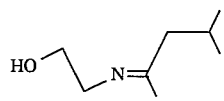

Ethanolamine MIBK imine

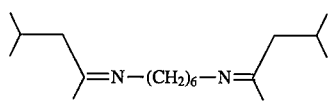

Hexamethylene Diamine MIBK Diimine

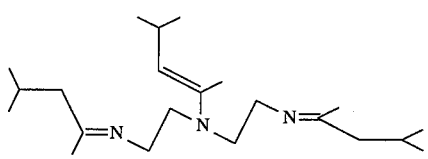

Diethylene triamine MIBK Diimine-Enamine

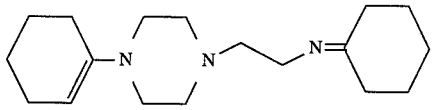

N-(2-Aminoethyl)piperazine cyclohexanone
imino-enamine

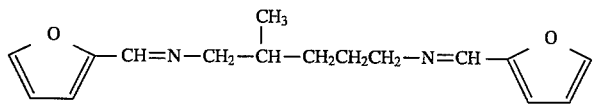

Dytek-A Furfural Diimine

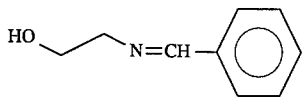

Ethanolamine Benzaldehyde Imine

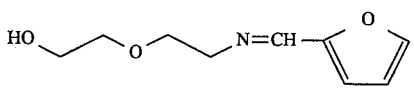

2-(2-aminoethyl)-ethanolamine Furfural Imine

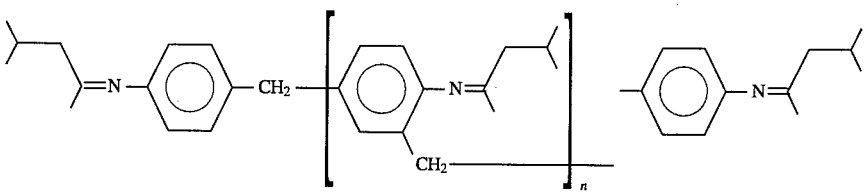

Polyaminophenyl-methane MIBK Polyimine
(and ring positional isomers thereof
wherein n = 0 to 15)

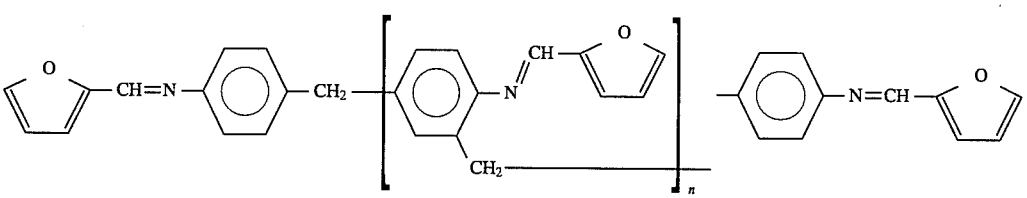

Polyaminophenyl-methane Furfural Polyimine
wherein n = 0 to 15

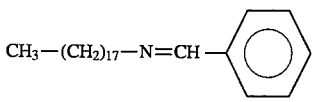

1-Octadecylamine Benzaldehyde Imine

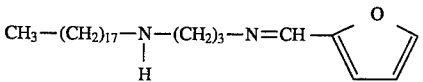

Tallow-Diamine Furfural Imine

The currently most preferred imino-functional compounds for use in the present invention include those derived from the reaction of benzaldehyde with 2-methyl-1,5-pentanediamine; furfuraldehyde with 2-methyl-1,5-pentanediamine; and diamino-diphenylmethane (both pure and polymeric forms) with benzaldehyde or furfuraldehyde. If desired the aldehydes can be replaced with ketones such as methylisobutylketone (MIBK) or cyclohexanone.

Dytek-A MIBK Diimine is prepared by reacting Dytek-A, which is 2-methyl-1,5-pentanediamine (also known as 2-methyl pentamethylene diamine) and which is available from E. I. du Pont de Nemours & Co., with methylisobutylketone (MIBK). Dytek-A Cyclohexanone Diimine is prepared by reacting Dytek-A with cyclohexanone, and Dytek-A Furfural Diimine is prepared by reacting Dytek-A with furaldehyde. Generally, these compounds are prepared by mixing 1.0 mole of Dytek-A in a flask and then slowly adding 2.3 moles of MIBK, cyclohexanone or furaldehyde to the Dytek-A. Optionally, the Dytek-A can be mixed with dry toluene before the MIBK, cyclohexanone or furaldehyde is added. Generally between 0.5 to 1.0 mole of toluene can be used. The initial reaction temperature is controlled at about 85° C. during the addition to the Dytek-A. The temperature is then allowed to rise and the reactants are refluxed for several hours, preferably about 2 hours.

Enamine-containing compounds which may be used as the curing agent of the invention include compounds having the structures:

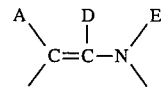

and

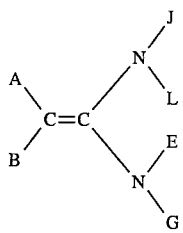

wherein each of A, B, D, E, G, J and L, independently, represents hydrogen or an optionally substituted organic radical, any of A, B and D and/or any of E, G, J and L optionally being joined together to form one or more carbocyclic or heterocyclic rings.

In many preferred enamino-functional compounds E, G, J and L are not hydrogen. Especially useful enamino-functional compounds contain two or more functional groups as a result of any of A, B, D, E, G, J and/or L being a radical terminating in one or more additional functional groups. Imino and/or enamino groups are the preferred "additional" functional groups.

Preferred enamino-functional compounds include those having a combined imine/enamine functionality of 2 to 4.

Suitable enamino-functional compounds may be obtained in known manner by reacting a carbonyl compound containing at least one alpha-hydrogen atom, for example an aliphatic, cycloaliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, acetophenone, mixtures of these and the like, with a secondary amine, for example a secondary amino functional compound.

Examples of preferred enamine-containing compounds include the following:

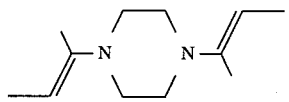

Piperazine MEK Di-enamine

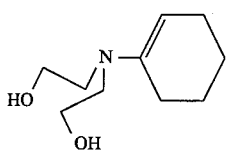

Diethanolamine cyclohexanone enamine (2)

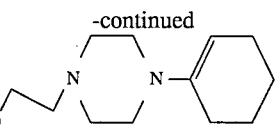

N-(2-hydroxyethyl)piperazine cyclohexanone enamine (3)

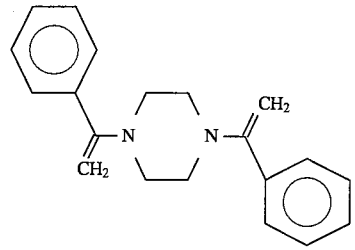

Piperazine-Acetophenone Di-enamine

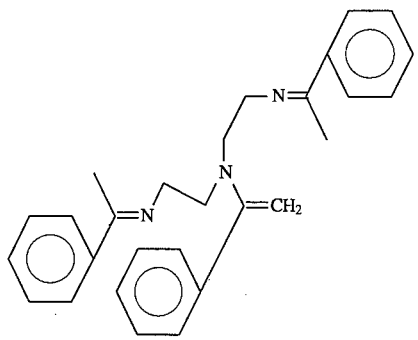

Acetophenone Enamino Diimine of Diethylene Triamine

The imino-functional and enamino-functional compounds suitable for use as cold curing agents are prepared by well known synthetic techniques. For example, the imino-functional and enamino-functional curing agents can be prepared according to the teachings of U.S. Pat. Nos. 4,794,129, 4,906,674, 4,910,279, 4,935,460 and 4,952,660, all of which are incorporated herein by reference. Some of the suitable imino-functional and enamino-functional compounds are commercially available. For example, oxazoline compounds having the formula:

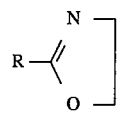

wherein R=—$CH_3$ or —$CH_2CH_3$ are commercially available liquids. The suitable imino- and enamino-functional compounds may be prepared separately or where possible, prepared in situ during the adhesive formulation (that is, for example, by mixing appropriate amines with appropriate aldehydes and/or ketones, in the presence of an internal dehydrating agent or absorbent filler material, and then adding the isocyanate component).

The suitable isocyanate-reactive curing agents generally have a number average molecular weight in the range of 57 to 10,000, preferably 80 to 7000 and most preferably 100 to 1000.

Many of the polyisocyanates and the isocyanate reactive curing agents described above, and others of similar structure, are low viscosity liquids. Liquidity and low viscosity make it easier to apply the adhesive/sealant reaction system.

In addition, low viscosity liquid curing agents can act as flow modifying agents during the application of the adhesive/sealant reaction system. Consequently, it is preferred for both the polyisocyanate and the curing agent to be liquids at room temperature. However, it is possible for one of the components of the system (i.e. the polyisocyanate or the curing agent) to be a solid as long as that component can be dissolved fully in the other liquid component prior to application of the adhesive/sealant reaction system to a substrate. This will ensure that the adhesive/sealant reaction system is a liquid when applied to a substrate.

It is also possible to apply the polyisocyanate and the curing agent components separately to a substrate instead of mixing them together before they are applied to a substrate. When applied separately, the adhesive/sealant reaction system is formed on the substrate once the second component is applied to the substrate. When the components are applied separately, they should both be liquids. It is preferred, however, to prepare the liquid adhesive/sealant reaction system by mixing or blending the polyisocyanate and the curing agent prior to applying the system to a substrate.

The polyisocyanate and the curing agent can be mixed or blended by any suitable means. Since both are usually low viscosity liquids, they can easily be mixed by stirring them together. When the polyisocyanate and the curing agent are mixed prior to being applied to a substrate, conventional fillers, such as calcium carbonate, and diluents, such as propylene carbonate, may be employed. It should be understood that the polyisocyanate in the reaction system can be comprised of one or more polyisocyanates and that one or more imino- or enamino-functional curing agents may be employed in the reaction system.

The polyisocyanate and the curing agent are combined in a manner such that the molecular number ratio of isocyanate groups in the aromatic polyisocyanate to the isocyanate-reactive functional groups of the curing agent is preferably at least about 2:1. Most preferably, the molecular number ratio of isocyanate groups to the imino- or enamino-functional linkages is in the range of about 3:1 to about 10:1.

If the polyisocyanate and the curing agent are mixed prior to being applied to a substrate, the resulting system has a working pot life of at least five minutes. Many of the adhesive/sealant systems have working pot lives that are much greater than five minutes. For example, the adhesive/sealant systems of the present invention can have a working pot life of days, weeks or even months.

The imino- and enamino-functional curing agents used herein are much more desirable than amine or polyol curing agents. The present curing agents do not begin reacting rapidly with aromatic isocyanates at the point of mixing as do the amines conventionally reacted with polyisocyanates and thus enable the systems of this invention to have longer pot lives than if conventional amines were used as the curing agents. When the curing agents of this invention are employed, there appears to be an induction period during which the reaction to form a polymer does not occur or is very slow. This induction period is often followed by a rapid curing reaction. Although polyol curing agents would provide systems with longer pot lives than systems containing polyamines, polyols require catalysts and can produce an undesirable amount of foaming when reacted with polyisocyanates. Generally, the adhesive/sealant reaction systems of the present invention cure with minimal or no foaming.

The reaction of the curing agents used in this invention with aromatic isocyanates appears to be direct. Generally, no volatile or monomeric by-products are apparent in the reaction. However, the course and nature of the reaction may vary with the type of curing agent and the substrate. In addition, the presence of active hydrogen species or organic or metallic ions on the substrate to which the adhesive/sealant reaction system is applied may accelerate the curing.

The liquid adhesive/sealant reaction system of this invention can be applied to a wide variety of substrates and can be used to bond different types of substrates to each other. For example, the system can be applied to wood and cement as a sealer or it can be used to bond a metal substrate to a wooden one. When the system is employed as a sealer, it improves the properties and water repellency of substrates to which it is applied. When two substrates are to be bonded together, it is preferred that at least one substrate material be selected from the group consisting of wood, paper, rice hulls, cement, stone, cloth, grass, corn husk, bagasse, nutshells, polymeric films and sheets, polymeric foams, metal, and fibrous materials. The systems can be used to fabricate multi-substrate composites or laminates, especially those comprising lignocellulosic or cellulosic materials such as wood or paper to prepare products such as plywood, laminated veneer lumber, waferboard, particleboard, fiberboard, chipboard, and oriented wood products, such as "Parallam" available from ICI Americas Inc.

It is preferred for the substrates to be moisture containing substrates. In general, the lower the moisture content of the substrate, the longer it takes for the adhesive/sealant system to cure. Preferably, the substrates have a moisture content in the range of 10 to 20% by weight, and most preferably, in the range of 12 to 15% by weight.

Although the adhesive/sealant systems of the invention are cold curable compositions, i.e., they can be cured at a temperature in the range of about 0° C. to about room temperature, they can also be hot cured. Thus, generally, the systems can be cured at a temperature in the range of about 0° C., to about 250° C. Preferably, they are cured at a temperature in the range of about 23° C. (room temperature) to 125° C., and most preferably in the range of about 23° C. to 110° C. Generally, most of the systems will cure sufficiently at room temperature in 30 to 60 minutes.

When the system is used to adhere two substrates together, a surface of one of the substrates is generally coated with the system and the coated surface is then pressed against a surface of the second substrate. The surfaces may be coated with the system by any conventional means, such as by spraying, brushing, etc. The surface of the second substrate against which the first substrate is pressed is usually not coated with the system. However, that surface can also be coated with the system before the substrates are pressed together. After the substrates are pressed together, they are maintained under pressure until the system has sufficiently cured so that the surfaces are strongly adhered to one another. Generally, a pressure in the range of 1.0 psi to 200 psi is sufficient.

The invention is illustrated by the following examples which are not intended to limit the scope of the invention.

EXAMPLE 1

A diphenylmethane diisocyanate (MDI) prepolymer was prepared by reacting 55.60 parts of MF 182, which is a mixture of diphenylmethane diisocyanates and which is available from ICI Americas Inc., with 44.07 parts of Niax PPG 2025, which is a 2025 molecular weight all propylene oxide diol and which is available from Union Carbide Corporation. After the reactants were mixed, they were stirred and heated for several hours at a temperature of about 75° C. to form an MDI prepolymer having a viscosity of 3000 cps and a 16 percent free NCO content. After the prepolymer cooled to room temperature, 0.26 parts of Niax A-4, an amine catalyst which is based on B-(dimethylamino) N,N-dimethyl propionamide and which is available from Union Carbide Corporation, was added to serve as a catalyst for the reaction between the polyisocyanate and the curing agent of the adhesive/sealant reaction system.

After the Niax A-4 was added to the prepolymer, 64.5 parts of the prepolymer, 6.5 parts of propylene carbonate (a diluent), 25.8 parts of calcium carbonate (a filler), and 3.2 parts of the methyl isobutyl ketone (MIBK) imine of Dytek A were mixed in a flask to prepare an adhesive/sealant system. The MIBK imine of Dytek A was prepared by adding 116.2 grams of Dytek A, which is 2-methyl pentamethylene diamine and which is available from E.I. du Pont de Nemours & Co., to a flask, containing 65 grams of dry toluene. After the Dytek A and toluene were blended, 230.37 grams of MIBK were slowly added over a period of 30 minutes from a dropping funnel while stirring. The initial reaction temperature was controlled to about 85° C. After about 30 minutes, the temperature was allowed to rise and the resultant water was collected in a Dean-Stark apparatus. Refluxing was continued for two hours with the temperature finally reaching about 150° C. At that point, no more water was being produced and infrared analysis showed no unreacted amine was present.

The adhesive/sealant system had a pot life of about six minutes. The system was applied to one side of a wooden board at a rate of 111 g/sq. meter. The coated side was then pressed against the surface of an uncoated board at a pressure of about 200 psi to adhere the boards to one another. After the adhesive/sealant system cured for 30 minutes at room temperature, the pressure was released. The resulting product could be readily handled and had excellent internal bond strength.

A coating of the adhesive/sealant system was also applied to the surface of a board as a sealant. The coating was allowed to cure for about an hour at room temperature. The board exhibited excellent water repellency.

EXAMPLE 2

Example 1 was repeated except that a conventional polyol, Quadrol (a hydroxy functional crosslinker based on propylene oxide extended ethylene diamine and having a hydroxyl value of 770 and available from Mobay and BASF), was used as the curing agent instead of an imine (the MIBK imine of Dytek A), and the amounts of the ingredients of the adhesive/sealant system were as follows: 64.1 parts of the MDI prepolymer of Example 1, 6.5 parts of propylene carbonate, 25.6 parts of calcium carbonate, and 3.2 parts of Quadrol. The adhesive/sealant system had a pot life of five minutes, and the product had lower shear strength than the product of Example 1. The shear strength of the products was tested by using a boil-dry-boil test. The test consisted of boiling a 7.6 centimeter by 2.5 centimeter sample for four hours in water, placing the sample in a 60° C. oven for 16 hours to dry, boiling the sample again in water for four hours, quenching the sample in cold water, and then immediately testing the sample to determine its shear strength. The Quadrol sample came apart during boiling while the product of Example 1 required about 160 psi to separate the boards that had been adhered to one another.

EXAMPLE 3

An adhesive reaction system was prepared by mixing 100 parts of the MDI prepolymer of Example 1 with 10 parts of propylene carbonate, 40.0 parts of calcium carbonate, and 5.0 parts of Dytek A furfural diimine. The Dytek A furfural diimine was prepared by adding 116.2 grams of Dytek A, which is 2-methyl pentamethylene diamine and which is available from E.I. du Pont de Nemours & Co., to a flask and then slowly adding 193.14 grams of furfural diimine over a period of 30 minutes from a dropping funnel while stirring. The initial reaction temperature was controlled to about 85° C. After about 30 minutes, the temperature was allowed to rise and the resultant water was collected in a Dean-Stark apparatus. Refluxing was continued for two hours with the temperature finally reaching about 150° C. At that point, no more water was being produced and infrared analysis showed no unreacted amine was present. The resulting product was a dark brown liquid.

The adhesive system had a pot life of several days. The adhesive system was applied at a rate of 156 g/sq meter to three Douglas Fir veneers with a moisture content over 10 percent by weight. The three veneers were stacked alternately for grain direction and then cured at room temperature for 30 minutes at 200 psi pressure. The resulting plywood product had excellent internal bond strength, excellent water resistance, and was suitable for exterior use.

EXAMPLE 4

An adhesive/sealant system was prepared by mixing together 100.0 parts of Rubinate M, which is polymeric MDI and which is available from ICI Americas Inc., 20.0 parts of calcium carbonate, and 25.0 parts of an aromatic imine which was the reaction product of MIBK and 4,4'-diamino diphenyl methane. The aromatic imine was prepared by adding 115.65 grams of 4,4'-diamino diphenyl methane to a flask containing 50 g of dry toluene and 0.25 g of p-toluenesulfonic-acid and then slowly adding 134.35 grams of MIBK over a period of 30 minutes from a dropping funnel while stirring. The initial reaction temperature was controlled to about 85° C. After about 30 minutes, the temperature was allowed to rise and the resultant water was collected in a Dean-Stark apparatus. Refluxing was continued for two hours with the temperature finally reaching about 150° C. At that point, no more water was being produced and infrared analysis showed no unreacted amine was present. The final product was a light brown liquid.

The adhesive system had a pot life of several days. The adhesive system was applied at a rate of 156 g/sq meter to three Douglas Fir veneers with a moisture content over 10 percent by weight. The three veneers were stacked alternately for grain direction and then hot cured in a press for three minutes at 149° C. and 200 psi pressure. The resulting plywood product had excellent internal bond strength, excellent water resistance, and was suitable for exterior use.

These examples demonstrate that the reaction systems of this invention can be employed as adhesives and sealants to yield products with good internal bond strength and excellent water resistance. These examples also demonstrate that the curing agents employed are superior to conventional polyols that are reacted with polyisocyanates and that the adhesive/sealant reaction systems can be employed with substrates having a high moisture content, such a lignocellulosic or cellulosic substrates. The examples further demonstrate that the reaction systems can be cold or hot cured and that when aromatic imines are employed as the curing agent, the systems can have extended pot lives.

The present invention may be embodied in other specific forms without departing from the spirit or essential attributes thereof and, accordingly, reference should be made to the appended claims, rather than to the foregoing specification, as indicating the scope of the invention.

What is claimed is:

1. A process for preparing composites of lignocellulosic or cellulosic substrates comprising the steps of:
   (a) coating a surface of one of the substrates with a liquid adhesive reaction system comprising:
      (i) a polyisocyanate having aromatically linked isocyanate groups and a number average isocyanate functionality in the range of 1.8 to 4.0, and
      (ii) a curing agent having at least one imino- or enamino-functional linkage, wherein the molecular number ratio of the total number of isocyanate groups in the polyisocyanate to the total number of imino- or enamino-functional linkages in the reaction system is in the range of 3:1 to 10.1;
   (b) pressing said surface against a surface of a second substrate; and
   (c) curing the reaction system.

2. The process of claim 1 wherein the adhesive reaction system is cured at room temperature.

3. The process of claim 1 wherein at least one substrate material is wood or paper.

4. A laminated article prepared by the process of claim 1.

5. The laminated article of claim 4 wherein at least one substrate material is wood or paper.

6. A process for bonding two substrates together comprising the steps of:
   (a) coating a surface of one of the substrates with a liquid adhesive reaction system comprising:
      (i) a polyisocyanate having aromatically linked isocyanate groups and a number average isocyanate functionality in the range of 1.8 to 4.0, wherein the polyisocyanate is not a prepolymeric polyisocyanate; and
      (ii) a curing agent having at least one imino- or enamino-functional linkage, wherein the molecular number ratio of the total number of isocyanate groups in the polyisocyanate to the total number of imino- or enamino-functional linkages in the reaction system is in the range of 3:1 to 10.1;
   (b) pressing said surface against a surface of a second substrate; and
   (c) curing the reaction system.

7. The process of claim 6 wherein the adhesive reaction system is cured at room temperature.

8. The process of claim 6 wherein at least one substrate is selected from the group consisting of wood, paper, rice hulls, cement, stone, cloth, grass, corn husk, begasse, nutshells, polymeric films and sheets, polymeric foams, metal and fibrous materials.

9. The process of claim 8 wherein at least one substrate material is wood or paper.

10. A laminated article prepared by the process of claim 6.

11. A laminated article of claim 10 wherein at least one substrate material is wood or paper.

12. A process for sealing the surfaces of a substrate comprising the steps of:
   (a) coating at least one surface of the substrate with a liquid sealant reaction system comprising:
      (i) a polyisocyanate having aromatically linked isocyanate groups and a number average isocyanate functionality in the range of 1.8 to 4.0, wherein the polyisocyanate is not a prepolymeric isocyanate; and
      (ii) a curing agent having at least one imino- or enamino-functional linkage, wherein the molecular number ratio of the total number of isocyanate groups in the polyisocyanate to the total number of imino- or enamino functional linkages in the sealant reaction system is in the range of 3:1 to 10:1; and
   (b) curing the sealant reaction system.

* * * * *